US007158007B2

(12) United States Patent
Kawamoto

(10) Patent No.: US 7,158,007 B2
(45) Date of Patent: Jan. 2, 2007

(54) LOCK CONTROL SYSTEM, LOCK CONTROLLER, AND KEY DEVICE

(75) Inventor: Yasutaka Kawamoto, Osaka (JP)

(73) Assignee: Oki Electric Industry, Co., Ltd., Tokyo (JP)

( * ) Notice: Subject to any disclaimer, the term of this patent is extended or adjusted under 35 U.S.C. 154(b) by 260 days.

(21) Appl. No.: 10/879,232

(22) Filed: Jun. 30, 2004

(65) Prior Publication Data

US 2005/0017839 A1 Jan. 27, 2005

(30) Foreign Application Priority Data

Jul. 25, 2003 (JP) ............................ 2003-201569

(51) Int. Cl.
*G05B 19/00* (2006.01)

(52) U.S. Cl. ....................... 340/5.64; 340/5.1; 340/5.2; 340/5.6; 340/540; 340/541; 340/5.62; 340/825.69; 340/825.72; 340/5.61; 340/5.63; 340/542

(58) Field of Classification Search ............... 340/5.64, 340/5.1, 5.2, 5.6, 540, 541, 542, 825.69, 340/825.72, 10.1; 235/382
See application file for complete search history.

(56) References Cited

U.S. PATENT DOCUMENTS 5,986,564 A * 11/1999 Fraser ........................ 340/5.6
2002/0067261 A1 * 6/2002 Kucharczyk et al. .... 340/568.1

FOREIGN PATENT DOCUMENTS

JP 2001-132293 5/2001

* cited by examiner

*Primary Examiner*—Brian Zimmerman
*Assistant Examiner*—Vernal Brown
(74) *Attorney, Agent, or Firm*—Wenderoth, Lind & Ponack, L.L.P.

(57) ABSTRACT

A lock is operated by a lock controller that receives identifying signals transmitted from one or more wireless key devices. Weights are assigned to the identifying signals, and the lock is operated only if the weights of the received identifying signals satisfy a condition, such as a threshold condition applied to their sum. The weights are preferably assigned by counting the number of times each identifying signal is registered in the lock controller. The count may be kept in the lock controller or in the wireless key device itself.

20 Claims, 4 Drawing Sheets

| NO. | KEY ID |
|---|---|
| 1 | 101235 |
| 2 | 234213 |
| 3 | 4055258 |
| 4 | |

⋮

| KEY ID | REGISTRATION COUNT |
|---|---|
| 101235 | 2 |
| 234213 | 1 |
| 4055258 | 1 |

⋮

LOCK CONTROL SYSTEM, LOCK CONTROLLER, AND KEY DEVICE

BACKGROUND OF THE INVENTION

1. Field of the Invention

The present invention relates to a lock control system, a lock controller, and a key device, more particularly to a system in which a plurality of key devices, used individually or in combination, control the opening and closing of a lock.

2. Description of the Related Art

Doors are customarily locked and unlocked by the use of a key. The traditional method of locking or unlocking a door is to insert the key into a keyhole by hand and then turn or press the key. A problem with this method is that it is difficult for a person who is manually or visually impaired. This problem particularly affects senior citizens, whose hand and arm functions and vision tend to deteriorate with advancing age. In today's aging society, this is a problem that needs to be solved.

One proposed solution is a lock operation system in which the entrance door to a dwelling is locked and unlocked by a lock controller that receives a signal from a wireless key device. A description can be found in, for example, Japanese Unexamined Patent Application Publication No. 2001-132293. When a user of this proposed system presses a button on the wireless key device, the device sends an identifying signal to the lock controller. When the lock controller receives this signal, it decides whether the signal was sent by a device authorized to operate the lock. If it was, the lock controller changes the lock either from the locked state to the unlocked state or from the unlocked state to the locked state. A user of this system can easily lock or unlock the door without having to insert a conventional key, and by pressing the button at a distance from a plurality of similar doors, thus the user can easily find the door which the key device can unlock.

This system can be modified so that the lock is operated by a plurality of wireless key devices, each transmitting a different identifying signal. For maximum security, the system can be designed so that all of the wireless key devices are necessary to operate the lock. Alternatively, the lock can be made to respond to signals transmitted from, for example, an arbitrary majority of the wireless key devices, so that even if some of the key devices are lost, the lock can still be operated, provided that not too many of the key devices are lost. The system may also be adapted so that any one of the wireless key devices can operate the lock.

This plural-key system becomes more flexible if different weights can be assigned to the different wireless key devices. For example, if key devices that can be easily lost or misplaced are given relatively small weights, the lock can still be operated even if all of these key devices are lost, provided enough of the other key devices remain. There are, however, two problems with such a weighting scheme.

The first problem is one of convenience and practicality. Assigning weights to the key devices is a troublesome procedure for the user, and it is moreover a procedure that has to be repeated, for all key devices, whenever the number of key devices is increased.

The second problem is that when the user assigns weights, the weights are assigned subjectively, with no guarantee that the assigned weights are appropriate. Frequently, a key device which the user thinks will never be lost, does in fact become lost. Thus, it is possible that the user may assign an inadvisably large weight to an easily losable key device.

SUMMARY OF THE INVENTION

An object of the present invention is to provide a lock control system, a lock controller, and a key device which enables a lock to be locked and unlocked by the use of a plurality of key devices to which weights can be flexibly assigned without requiring troublesome operations by the user.

The invention provides a lock control system including a lock device and at least one key device transmitting a unique signal to a receiver, and a weight memory in which the unique signal transmitted by each key device is registered by storing a weight indicating the importance of the unique signal. An authentication unit reads the weights of the unique signals received by the receiver from the weight memory, thereby deciding whether authentication passes or fails. If authentication passes, a lock operating unit changes the lock from the locked state to the unlocked state, or from the unlocked state to the locked state.

The invention also provides a lock controller including a receiver, a weight memory, an authentication unit, and a lock operating unit as described above.

The unique signal transmitted by the key device is stored in the key device. Typically there are two or more key devices, each storing a separate unique signal. The weights stored in the weight memory to indicate the importance of the unique signals may be calculated from the number of times each unique signal is registered. The calculated weights can also be changed from time to time to enhance the security of the lock.

The invention further provides a key device having a unique signal memory storing the unique signal transmitted by the key device, a registration detector for detecting whether the unique signal has been registered in a lock controller, and a counter for keeping a count indicating the number of times the registration detector detects that the unique signal has been registered. The count is stored in a memory in the counter. A transmitter in the key device transmits the signal stored in the unique signal memory and the count stored in the counter to the lock controller. The lock controller accordingly does not have to keep count of the number of times each unique signal is registered, and the key device can be accurately weighted by a plurality of lock controllers.

DETAILED DESCRIPTION OF THE INVENTION

Figure 1:
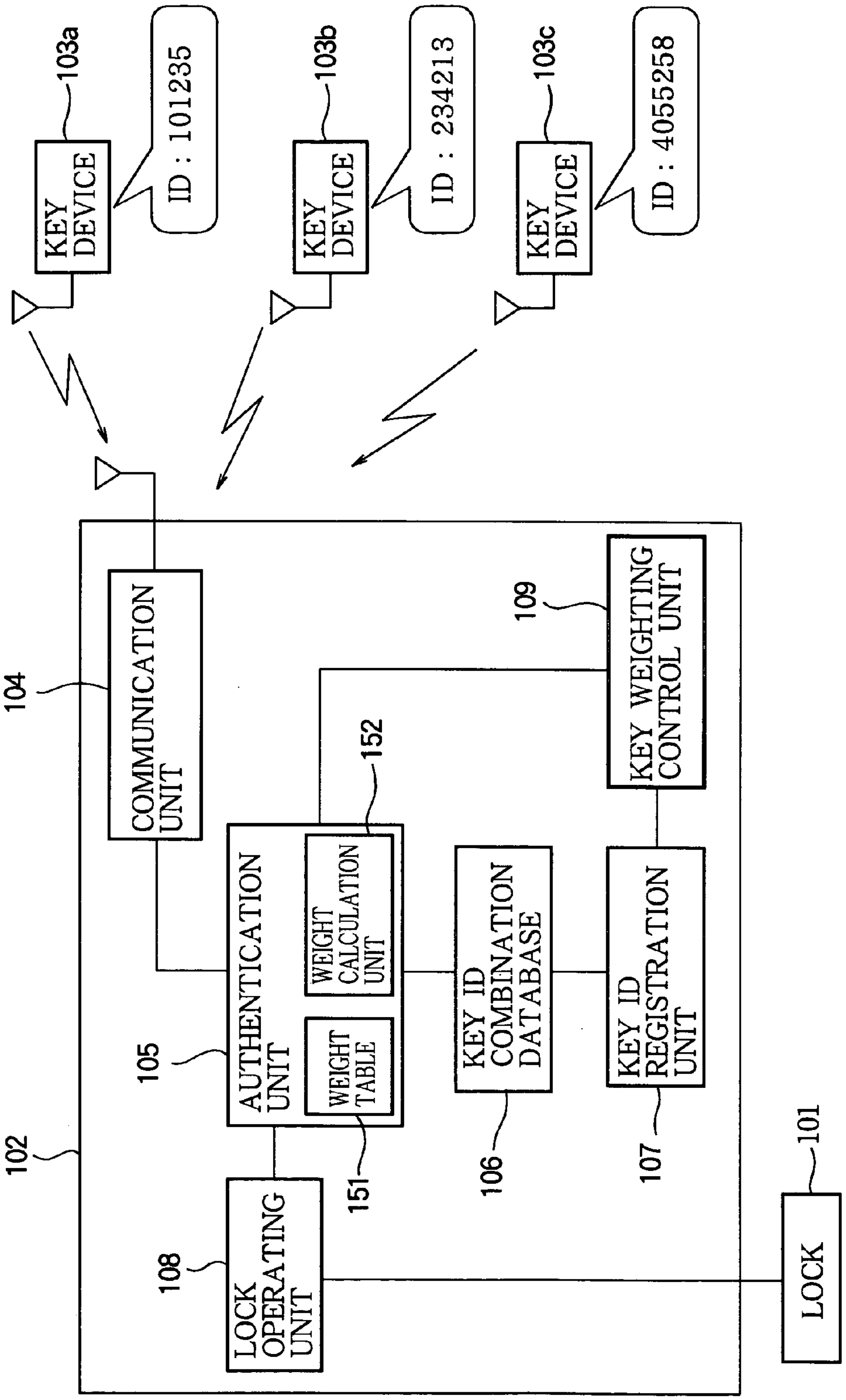
FIG. 1 is a block diagram of a lock control system illustrating a first embodiment of the invention.

Embodiments of the invention will now be described with reference to the attached drawings, in which like elements are indicated by like reference characters.

First Embodiment

Referring to FIG. 1, the first embodiment is a lock control system comprising a lock 101 with conventional lock functions, a lock controller 102 by which the lock can be controlled, and three key devices 103*a*, 103*b*, 103*c*, an arbitrary one of which will be referred to below as a key device 103.

Each key device 103 stores a unique key identifier (ID) and has a transmitter for transmitting the ID to the lock controller 102 for purposes such as registration and authentication. In the following description, the ID of key device 103*a* is '101235', the ID of key device 103*b* is '234213', and the ID of key device 103*c* is '4055258'.

The lock controller 102 comprises a communication unit 104 that receives the IDs transmitted by the key devices 103*a*, 103*b*, 103*c*, an authentication unit 105 that authenticates the IDs received by the communication unit 104, a key ID combination database 106 that stores key IDs and combinations thereof, a key ID registration unit 107 that registers the key IDs and combinations in the key ID combination database 106, a lock operating unit 108 that operates the lock 101 at the direction of the authentication unit 105, and a key weighting control unit 109 that generates information for assigning weights to the key IDs.

The lock 101 is connected to the lock operating unit 108, and changes between the locked state and the unlocked state in response to operations performed by the lock operating unit 108. The lock 101 can also be locked and unlocked by use of a conventional manually inserted key, and can thereby be locked and unlocked even if the lock controller 102 is disabled by, for example, a power failure.

Figures 2, 3, 4:
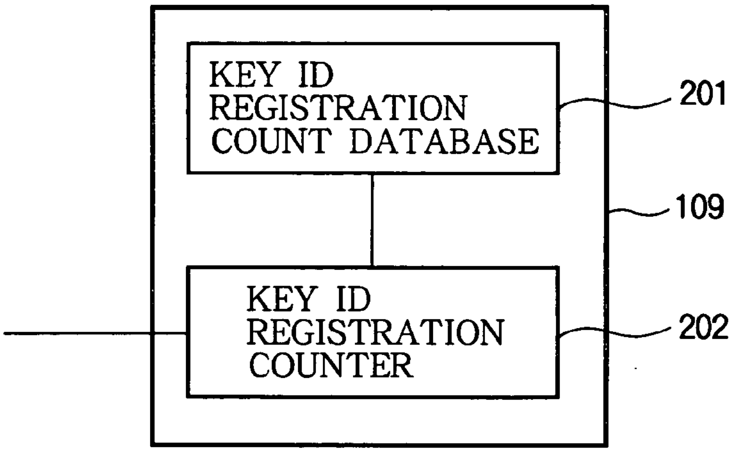
FIG. 2 is a block diagram showing the internal structure of the key weighting control unit in FIG. 1.
FIG. 3 is a table showing exemplary contents of the key ID combination database in FIG. 1.
FIG. 4 is a table showing exemplary contents of the key ID registration count database in FIG. 2.

Referring to FIG. 2, the key weighting control unit 109 comprises a key ID registration count database 201 that stores the number of times that the different key IDs have been registered, and a key ID registration counter 202 that counts these numbers of times.

Referring again to FIG. 1, in the lock controller 102, the communication unit 104 is connected to the authentication unit 105, to which it sends each key ID received from a key device 103.

The authentication unit 105, which includes a weight table 151 and a weight calculation unit 152, is connected to the key ID combination database 106, the lock operating unit 108, and the key ID registration count database 201. The authentication unit 105 authenticates the combination of key IDs received at the communication unit 104 by referring to data stored in the key ID combination database 106 and weight table 151 and sends the result to the lock operating unit 108.

Using the key IDs stored in the key ID combination database 106 and key ID registration counts stored in the key ID registration count database 201, the weight calculation unit 152 in the authentication unit 105 calculates key ID weights representing the importance of the respective key devices. The authentication unit 105 stores the calculated weights in the weight table 151, which is updated every time a key is registered. The authentication unit 105 receives key IDs from the communication unit 104, refers to the weight table 151 to determine the corresponding weights, and authenticates the key IDs based on their weights. The details of the authentication process will be described later.

The key ID combination database 106, which is connected to the authentication unit 105 and the key ID registration unit 107, stores key IDs or combinations thereof that have been received from the key ID registration unit 107, and provides the key IDs or combinations thereof to the authentication unit 105 for authentication purposes.

The key ID registration unit 107, which is connected to the key ID combination database 106 and the key ID registration counter 202 in the key weighting control unit 109, registers the key IDs of the key devices 103 and notifies the key ID registration counter 202 that this has been done. Exemplary key ID registration methods are manual input from a numeric keypad and automatic input by a communication link, but the possible methods are not limited to these.

The lock operating unit 108, which is connected to the authentication unit 105 and the lock 101, changes the state of the lock 101 from locked to unlocked, or vice versa, in response to acknowledgement of successful authentication from the authentication unit 105.

The key ID registration count database 201 in the key weighting control unit 109 is connected to the authentication unit 105 and key ID registration counter 202. On command from the key ID registration counter 202, the key ID registration count database 201 stores the registration count of a key device 103; if queried by the authentication unit 105, the key ID registration count database 201 returns the registration count of the key device 103.

The key ID registration counter 202 is connected to the key ID registration unit 107 and the key ID registration count database 201. The key ID registration counter 202 increments the registration count of a key device 103 whenever notified by the key ID registration unit 107 that the key ID of the key device 103 has been registered, and commands the key ID registration count database 201 to store the new count value.

The components of the lock control system described above operate by the following procedure.

The key ID registration unit 107 registers the key IDs of the key devices 103*a*, 103*b*, and 103*c* (101235, 234213, and 4055258, respectively) in the key ID combination database 106 in advance as shown in FIG. 3. The key ID registration unit 107 also sends these key IDs to the key ID registration counter 202 in the key weighting control unit 109.

When notified by the key ID registration unit 107 that the key ID of a key device 103 has been registered, the key ID registration counter 202 searches the key ID registration count database 201 for the registration count of the key device 103 and increments the count value, updating the key ID registration count database 201.

In the following description, the registration count of key device 103*a* is two (2), and the registration counts of key devices 103*b* and 103*c* are one (1), as shown in FIG. 4.

When a user carrying a key device 103 approaches the relevant door, the key device 103 senses the approach by sensing that the distance from the key device 103 to the lock controller 102 installed in the door is within a predetermined value, and transmits its key ID to the communication unit 104 in the lock controller 102. Various methods of sensing the approach of the key device 103 to the lock controller 102 are available, including manual input by the user. For example, the user may press buttons (not shown in FIG. 1) on the plurality of key devices 103 with registered key IDs simultaneously, or substantially simultaneously, to have the corresponding key devices 103 send their key IDs to the communication unit 104 in the lock controller 102. Another possible method is one-way or two-way periodic transmission of sensing signals between the key device 103 and the lock controller 102 followed by mutual responses when the key device 103 approaches within the predetermined distance.

The communication unit 104 sends the one or more received key IDs to the authentication unit 105 for authentication. If authentication succeeds, then the authentication unit 105 notifies the lock operating unit 108, which locks or unlocks the lock 101.

Authentication succeeds if the key ID or IDs received from the communication unit 104 are stored in the key ID combination database 106, and the sum of their weights exceeds a predetermined threshold value. The weights are the weights stored in the weight table 151, which have been assigned by the weight calculation unit 152 based on the key ID registration counts stored in the key ID registration count database 201. The weights may be equal to or proportional to the registration counts. In FIG. 4, for example, the weight calculation unit 152 may assign weight two (2) to key device 103*a* (key ID: 101235), and weight one (1) to key devices 103*b* (key ID: 234213) and 103*c* (key ID: 4055258).

The threshold value for determining that authentication succeeds can be defined as, for example, fifty percent (50%) of the sum of the weights of all the key IDs registered in the key ID combination database 106. If the weights are equal to the registration counts in FIG. 4, accordingly, the threshold value is determined as follows.

$$\text{Threshold value}=(2+1+1)\times(50/100)=2$$

In this case, authentication succeeds if the sum of the weights of the key IDs (or the weight of the single key ID) received from the communication unit 104 is two or more. The key ID combinations that pass authentication are therefore the following five: (101235), (101235 and 234213), (101235 and 4055258), (101235, 234213, and 4055258), and (234213 and 4055258). In other words, the lock can be operated by key device 103*a*, by any combination including key device 103*a*, or by the combination of key devices 103*b* and 103*c*. Neither key device 103*b* nor key device 103*c* can operate the lock alone, however, because the weights of their key IDs are less than the threshold value (2).

As described above, the lock control system in the first embodiment assigns weights to the key devices 103 according to their key ID registration counts, without requiring the user to assign weights to the key devices 103 directly.

A key device 103 having a comparatively high key ID registration count in the lock controller 102 is likely to be frequently carried and used by the user, and is correspondingly unlikely to be misplaced or lost. Therefore, the lock control system assigns comparatively high weights to key devices 103 with high key ID registration counts. In the example above, one such key device 103*a* receives a weight high enough that it can operate the lock by itself.

A key device 103 having a comparatively low key ID registration count in the lock controller 102 is less likely to be frequently carried and used by the user, and is therefore more likely to be misplaced or lost. Such a key device 103 is assigned a comparatively low weight and cannot operate the lock by itself. Therefore, if the user loses the key device 103, the lock cannot be operated by a third party who has unlawfully or accidentally obtained the key device 103. In the example above, key devices 103*b* and 103*c* have low registration counts and weights. The user can keep these key devices as spares, in the event that the key device 103*a* the user normally uses is lost, without the worry that the loss or theft of a single spare key device might compromise the security of the lock.

The automatic weighting of key IDs in the first embodiment is particularly useful when there are many key devices 103, or when the user occasionally changes the key device 103 or combination of key devices 103 that he or she normally uses. Manual input of weights in these cases would be a considerable inconvenience. By changing the key device 103 or combination of key devices 103 that he or she normally uses from time to time, the user can improve the security of the lock system without any loss of convenience. That is, the user can vary the signals that operate the lock 101 just by changing the combination of key devices 103 normally carried, with no extra effort required, because the weights stored in the weight table are updated automatically each time a key device or combination of key devices is registered.

By providing automatic weighting of key devices 103, the first embodiment also prevents the key devices 103 from being weighted inappropriately by the user.

Second Embodiment

Figure 5:
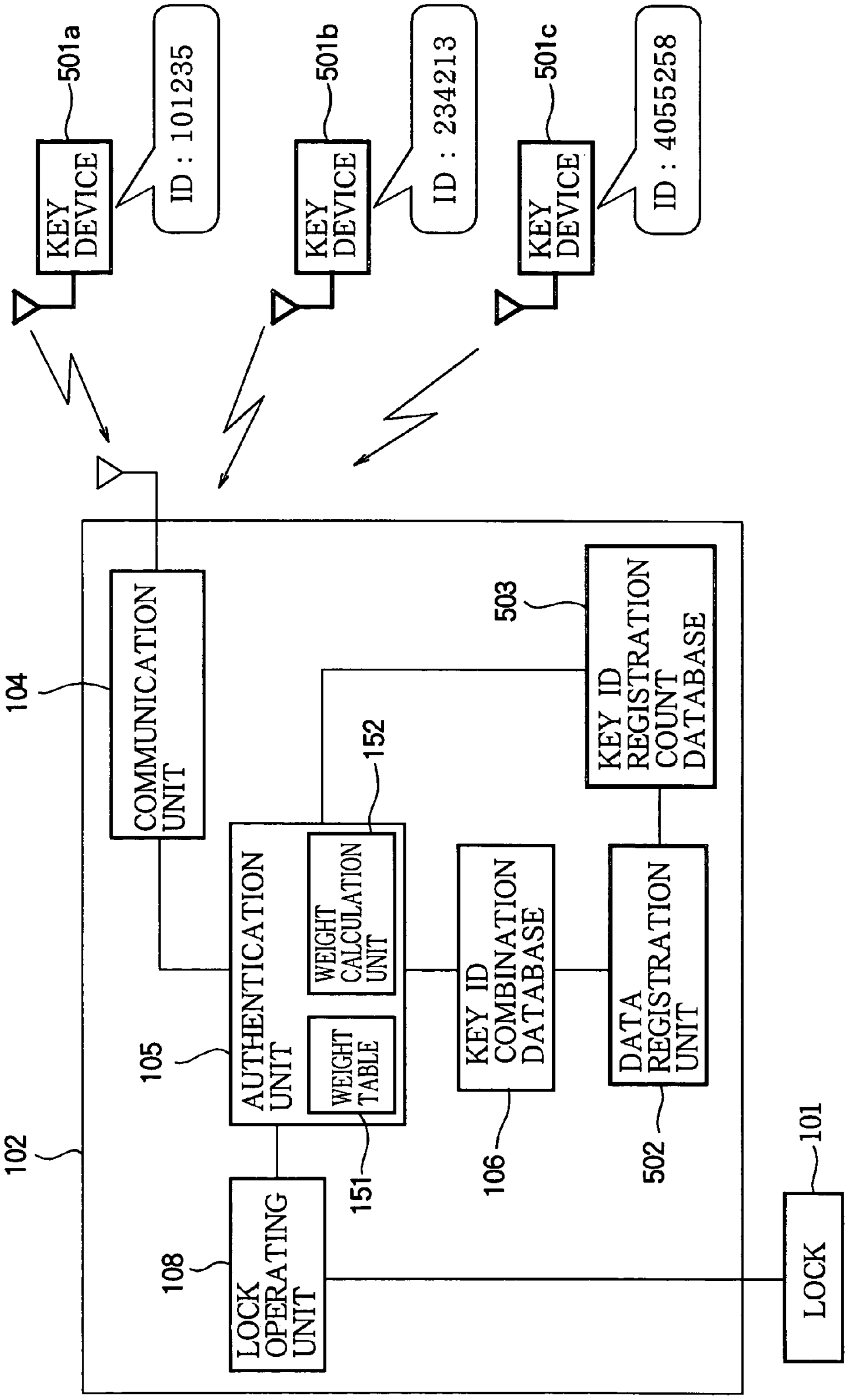
FIG. 5 is a block diagram of a lock control system illustrating a second embodiment of the invention.

Referring to FIG. 5, the lock controller 102 in the second embodiment comprises a communication unit 104, an authentication unit 105, a key ID combination database 106, and a lock operating unit 108 as in the first embodiment, but replaces the key ID registration unit and key weighting control unit of the first embodiment with a data registration unit 502 and a key ID registration count database 503. The second embodiment also employs key devices 501*a*, 501*b*, and 501*c* differing from the key devices of the first embodiment. An arbitrary one of these three key devices will be referred to below as a key device 501.

As in the first embodiment, each key device 501 has wireless communication functions and stores a unique key identifier (ID) that it transmits to the lock controller 102 for purposes such as registration and authentication. In the following description, the ID of key device 501*a* is '101235', the ID of key device 501*b* is '234213', and the ID of key device 501*c* is '4055258'. In the second embodiment, each key device 501 keeps a count of the number of times it has been registered and transmits its latest registration count to the lock controller 102 together with its key ID.

Figure 6:
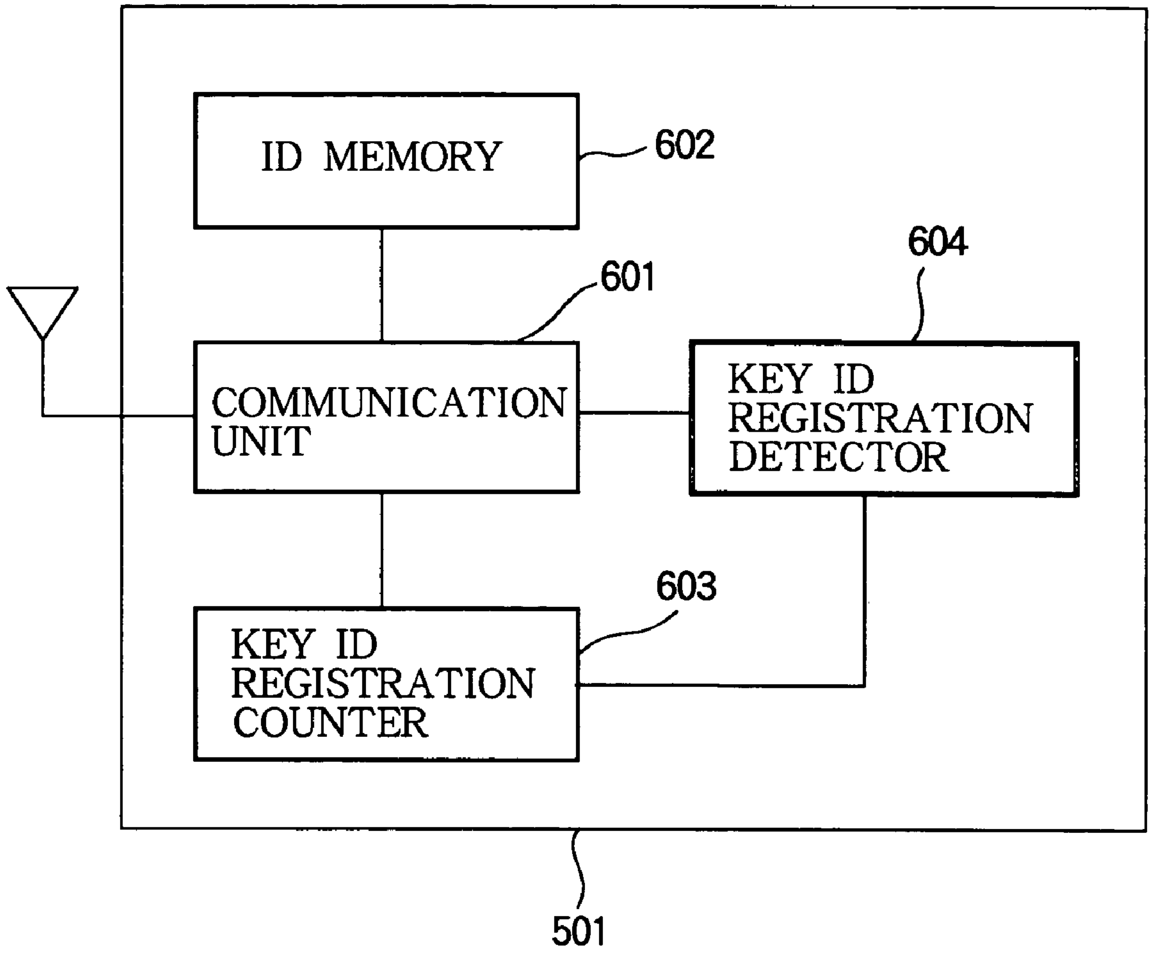
FIG. 6 is a block diagram showing the internal structure of the key devices in FIG. 5.

Referring to FIG. 6, a key device 501 comprises a communication unit 601 for communicating with the lock controller 102, an ID memory 602 for storing the key ID, a key ID registration counter 603 for keeping the ID registration count in an internal memory, and a key ID registration detector 604 for detecting that the key ID has been registered in the lock controller 102.

The communication unit 601 is connected to the ID memory 602, the key ID registration counter 603, and the key ID registration detector 604. In response to requests from the lock controller 102 or operations by the user, the communication unit 601 sends the lock controller 102 the key ID stored in the ID memory 602 and the registration count stored in the key ID registration counter 603. The communication unit 601 also notifies the key ID registration detector 604 when the key ID is registered in the data registration unit 502.

The ID memory 602, which is connected to the communication unit 601, sends the communication unit 601 its stored key ID on request from the communication unit 601.

The key ID registration counter 603 is connected to the communication unit 601 and the key ID registration detector 604. When the key ID registration detector 604 detects the registration of a key ID, the key ID registration counter 603 increments its key ID registration count. The key ID registration counter 603 sends the key ID registration count to the communication unit 601 on request from the communication unit 601.

The key ID registration detector 604, which is connected to the key ID registration counter 603 and the communication unit 601, monitors the communication unit 601 to detect that the communication unit 601 has registered the key ID in the data registration unit 502. When the key ID registration detector 604 detects that the key ID has been registered in the lock controller 102, it notifies the key ID registration counter 603.

The second embodiment is not restricted to any particular method of detecting that the key ID has been registered in the lock controller 102. One possible method is manual input by the user, in which case it is not necessary for the key ID registration detector 604 to be connected to the communication unit 601.

The data registration unit 502 performs the functions of the key ID registration unit 107 in the first embodiment, and in addition can store the registration count of each key device 501 in the key ID registration count database 503. More specifically, the data registration unit 502 is connected to the key ID registration count database 503 and the key ID combination database 106, stores received key ID combinations in the key ID combination database 106, and stores received key ID registration counts in the key ID registration count database 503.

The key ID registration count database 503 has substantially the same functions as the key ID registration count database in the first embodiment. More specifically, the key ID registration count database 503, which is connected to the data registration unit 502 and the authentication unit 105, stores key ID registration counts received from the data registration unit 502, and returns the stored key ID registration counts to the authentication unit 105 on request from the authentication unit 105.

The operation of the second embodiment will be described below, omitting descriptions of operations that are the same as in the first embodiment.

The key ID registration detector 604 in a key device 501 continuously monitors the registration of the key ID in the lock controller 102 through the communication unit 601. Whenever the key ID registration detector 604 detects that the key ID has been registered in the lock controller 102, the key ID registration count stored in the key ID registration counter 603 is incremented by one.

When the key ID is registered, the communication unit 601 transmits both the key ID and the corresponding key ID registration count stored in the key ID registration counter 603 to the lock controller 102, where the data registration unit 502 carries out the registration process.

The registration process will now be described in more detail. In the following description, the key ID registration count stored in the key ID registration counter 603 in key device 501*a* is two (2), and the key ID registration counts stored in the key ID registration counter 603 in key device 501*b* and key device 501*c* are one (1).

When the key devices 501*a*, 501*b*, and 501*c* register their key IDs, these registration counts are first sent, together with the corresponding key IDs, to the data registration unit 502 in the lock controller 102. The key IDs are then stored in the key ID combination database 106 as shown in FIG. 3; the key IDs and the corresponding registration counts are stored in the key ID registration count database 503.

At the completion of registration, the key devices 501*a*, 501*b*, and 501*c* increment the corresponding key ID registration counts stored in the key ID registration counter 603 of each key device.

The authentication unit 105 uses the information stored in the key ID combination database 106 and the key ID registration count database 503 to carry out authentication in the same way as in the first embodiment, by assigning weights to the key IDs.

By having each key device 501 count the number of times its ID has been registered in the lock controller 102 as described above, the lock control system in the second embodiment provides the same effects as in the first embodiment. In assigning weights to the key IDs in the first embodiment, however, the lock controller 102 counts only the number of times it has registered the key IDs itself. In the second embodiment the same key device 501 can be used with a plurality of lock controllers 102, each of which will assign weights according to the number of times the key device 501 has been registered in all of the lock controllers 102. The assigned weights will therefore reflect the frequency of use of the key devices 501, as desired, rather than the frequency of use of the lock controllers 102.

In the second embodiment, a key device 501 may also calculate its own weight by using its key ID registration count and transmit the calculated result instead of the key ID registration count to the lock controller 102, eliminating the need for weight calculation by the authentication unit 105 in the lock controller 102.

This invention is not limited to the embodiments described above. Further possible variations include, for example, the following.

Instead of using the key ID registration count of a key device as its weight, as in the first and second embodiments, the authentication unit 105 may define one or more threshold values, set weights for ranges bounded by the threshold values, and assign a weight to a key device by comparing its ID registration count with the defined threshold values.

In the first and second embodiments, authentication passes (succeeds) when the sum of the weights of the key IDs received from the communication unit 104 exceeds fifty percent (50%) of the total weight of all registered key IDs, but similar effects are obtained if the pass-fail threshold is different from fifty percent.

The first and second embodiments include three key devices each, but the number of key devices may be increased.

Even when the authentication unit 105 in the first and second embodiments receives only a single key ID from the communication unit 104, it may determine that authentication has succeeded if the weight of the key ID exceeds the pass-fail fail threshold value. In a variation of these embodiments, the authentication unit 105 may be adapted to make authentication fail unless at least one more key ID is received. In other words, successful authentication requires at least two key devices. This variation protects a user who has lost a much-registered key device 103, by ensuring that the lost key device 103 will be unable to unlock the lock 101 by itself, no matter how high its weight.

The lock control system in the first and second embodiments uses key IDs for authentication, but other unique signal data stored in a key device can also be used for the same effect.

Applications of the lock control system of the present invention are not limited to door locking and unlocking systems; other possible applications include security systems for safes and cars and locking functions for preventing unauthorized use of computers. The locks in these systems may be physical locking mechanisms such as electronic locks or software locking features for prohibiting unauthorized access.

Those skilled in the art will recognize that still further variations are possible within the scope of the invention, which is defined by the appended claims.

What is claimed is:

1. A lock control system comprising:

a lock having a locked state and an unlocked state;

a plurality of key devices operable to transmit respective unique signals;

a receiver operable to receive the unique signal transmitted by each said key device;

a weight memory operable to register each received unique signal by storing a weight indicating the importance of each unique signal;

an authentication unit operable to read, from said weight memory, the weight of each received unique signal, operable to calculate a sum of the read weights, and operable to determine whether an authentication passes or fails based on the sum of the weights; and a lock operating unit operable to change said lock from the locked state to the unlocked state, or from the unlocked state to the locked state, if said authentication unit determines that the authentication passes.

2. The lock control system of claim 1, wherein said authentication unit is operable to determine that the authentication fails if only one unique signal is received by said receiver.

3. The lock control system of claim 1, wherein the unique signal is registered by manual input.

4. The lock control system of claim 1, wherein the unique signal is registered automatically via a communication link.

5. The lock control system of claim 1, wherein:

at least one set of key devices in said plurality of key devices is assigned a cumulative weight and said authentication unit is operable to determine that the authentication passes if said receiver receives unique signals from all key devices in the set of keys, and that the authentication fails if said receiver receives unique signals only from a subset of the key devices in the set of key devices; and another key device in said plurality of key devices is assigned a weight such that said another key device is still operable to pass authentication in the event of the absence of any key device in the set of key devices.

6. A lock control system comprising:

a lock having a locked state and an unlocked state;

at least one key device operable to transmit a unique signal;

a receiver operable to receive the unique signal transmitted by each said key device;

a weight memory operable to register each received unique signal by storing a weight indicating the importance of each unique signal;

a registration count memory operable to store a cumulative registration count corresponding to each unique signal so as to indicate the number of times each unique signal has been registered, wherein the weight stored in said weight memory for each unique signal corresponds to the registration count of each unique signal;

an authentication unit operable to read, from said weight memory, the weight of each received unique signal, operable to calculate a sum of the read weights, and operable to determine whether an authentication passes or fails based on the sum of the weights; and a lock operating unit operable to change said lock from the locked state to the unlocked state, or from the unlocked state to the locked state, if said authentication unit determines that the authentication passes.

7. The lock control system of claim 6, further comprising a weight calculation unit operable to compare each cumulative registration count stored in said registration count memory with at least one threshold value so as to calculate the corresponding weight of each unique signal stored in said weight memory.

8. A lock control system comprising:

a lock having a locked state and an unlocked state;

at least one key device operable to transmit a unique signal;

a receiver operable to receive the unique signal transmitted by each said key device;

a weight memory operable to register each received unique signal by storing a weight indicating the importance of each unique signal;

an authentication unit operable to read, from said weight memory, the weight of each received unique signal, operable to calculate a sum of the read weights, and operable to determine whether an authentication passes or fails based on the sum of the weights of the unique signal, wherein said authentication unit is operable to determine that the authentication passes if the sum of the read weights of all the received unique signals is equal to or greater than a predetermined fraction of a sum of all the weights stored in said weight memory; and a lock operating unit operable to change said lock from the locked state to the unlocked state, or from the unlocked state to the locked state, if said authentication unit determines that the authentication passes.

9. A lock control system comprising:

a lock having a locked state and an unlocked state;

at least one key device operable to transmit a unique signal;

a receiver operable to receive the unique signal transmitted by each said key device;

a weight memory operable to register each received unique signal by storing a weight indicating the importance of each unique signal, wherein the weight of each unique signal stored in said weight memory is updated each time the corresponding unique signal is registered so as to indicate the importance of each unique signal;

an authentication unit operable to read, from said weight memory, the weight of each received unique signal, operable to calculate a sum of the read weights, and operable to determine whether an authentication passes or fails based on the sum of the weights; and a lock operating unit operable to change said lock from the locked state to the unlocked state, or from the unlocked state to the locked state, if said authentication unit determines that the authentication passes.

10. A lock controller for controlling the state of a lock according to a plurality of unique signals transmitted by respective key devices, the lock controller comprising:

a receiver operable to receive the plurality of unique signals;

a weight memory operable to register each received unique signal among the plurality of received unique signals by storing a weight indicating the importance of each unique signal;

an authentication unit operable to read, from said weight memory, the weight of each received unique signal, operable to calculate a sum of the read weights, and operable to determine whether an authentication passes or fails based on the sum of the weights; and a lock operating unit operable to change the lock from the locked state to the unlocked state, or from the unlocked state to the locked state, if said authentication unit determines that the authentication passes.

11. The lock controller of claim 10, further comprising a registration count memory operable to store a cumulative registration count corresponding to each unique signal so as to indicate the number of times each unique signal has been registered, wherein the weight stored in said weight memory for each unique signal corresponds to the registration count of each unique signal.

12. The lock controller of claim 11, further comprising a weight calculation unit operable to compare each cumulative registration count stored in said registration count memory with at least one threshold value so as to calculate the corresponding weight of each unique signal stored in said weight memory.

13. The lock controller of claim 10, wherein said authentication unit is operable to determine that the authentication passes if a sum of the read weights of all received unique signals is equal to or greater than a predetermined fraction of a sum of all the weights stored in said weight memory.

14. The lock controller of claim 10, wherein said authentication unit is operable to determine that the authentication fails if only one unique signal is received by said receiver.

15. The lock controller of claim 10, wherein the unique signal is registered by manual input.

16. The lock controller of claim 10, wherein the unique signal is registered automatically via a communication link.

17. The lock controller of claim 10, wherein the weight of each unique signal stored in said weight memory is updated each time the corresponding unique signal is registered so as to indicate the importance of each unique signal.

18. The lock controller of claim 10, wherein:

at least one set of key devices in said plurality of key devices is assigned a cumulative weight and said authentication unit is operable to determine that the authentication passes if said receiver receives unique signals from all key devices in the set of keys, and that the authentication fails if said receiver receives unique signals only from a subset of the key devices in the set of key devices; and another key device in said plurality of key devices is assigned a weight such that said another key device is still operable to pass authentication in the event of the absence of any one key device in the set of key devices.

19. A key device comprising:

a unique signal memory operable to store a signal unique to the key device;

a registration detector operable to detect whether the signal unique to the key device has been registered in a lock controller;

a counter operable to maintain a cumulative count indicating the number of times said registration detector detects that the signal unique to the key device has been registered;

a registration count memory operable to store the cumulative count maintained by said counter; and a transmitter operable to transmit the signal stored in said unique signal memory and the cumulative count stored in said registration count memory to the lock controller.

20. The key device of claim 19, wherein the key device is operable to calculate a weight according to the cumulative count stored in said registration count memory, and said transmitter is operable to transmit the weight and the signal stored in said unique signal memory to the lock controller.

* * * * *